United States Patent
Oizumi

(10) Patent No.: US 10,528,297 B2
(45) Date of Patent: Jan. 7, 2020

(54) PRINTING INSTRUCTING APPARATUS, MANAGEMENT SERVER, PRINTING MANAGEMENT APPARATUS, PRINTER, NON-TRANSITORY COMPUTER READABLE MEDIUM, AND PRINTING INSTRUCTION METHOD FOR TRANSMITTING AND RECEIVING INFORMATION RELATED TO PRINTING

(71) Applicant: FUJI XEROX CO., LTD., Tokyo (JP)

(72) Inventor: Masahiro Oizumi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 16/113,313

(22) Filed: Aug. 27, 2018

(65) Prior Publication Data

US 2019/0278533 A1    Sep. 12, 2019

(30) Foreign Application Priority Data

Mar. 9, 2018    (JP) .................................. 2018-043480
Mar. 9, 2018    (JP) .................................. 2018-043481

(51) Int. Cl.
*G06F 3/12*    (2006.01)

(52) U.S. Cl.
CPC .......... *G06F 3/1207* (2013.01); *G06F 3/1259* (2013.01); *G06F 3/1292* (2013.01)

(58) Field of Classification Search
None
See application file for complete search history.

(56) References Cited

U.S. PATENT DOCUMENTS

| | | | | |
|---|---|---|---|---|
| 5,463,473 A | * | 10/1995 | Yamada | H04N 1/4056 347/132 |
| 6,476,927 B1 | * | 11/2002 | Schwarz, Jr. | G06F 3/1205 358/1.13 |
| 7,136,179 B2 | * | 11/2006 | Ohara | H04N 1/32502 358/1.15 |
| 2005/0203805 A1 | * | 9/2005 | Clough | G06Q 30/04 705/26.1 |
| 2009/0051962 A1 | * | 2/2009 | Asai | G06F 3/1205 358/1.15 |
| 2017/0070642 A1 | * | 3/2017 | Miyamoto | B41J 29/38 |

FOREIGN PATENT DOCUMENTS

JP    2006-146387 A    6/2006
JP    2006-185333 A    7/2006

* cited by examiner

*Primary Examiner* — Thomas D Lee
(74) *Attorney, Agent, or Firm* — Oliff PLC

(57) ABSTRACT

A printing instructing apparatus includes a designation-information transmission unit and a printing-information transmission unit. The designation-information transmission unit transmits, to a management server, designation information that is information different from printing information indicating content of a printing target and that includes printing designation information designating the printing information. The printing-information transmission unit transmits the printing information corresponding to the printing designation information to one of multiple printers without transmitting the printing information to the management server.

13 Claims, 21 Drawing Sheets

FIG. 14

Connection is approved.
Give printing instruction from portal.

FIG. 17

```
Printing by external user is complete.
· x sheets
· Color
· 50 Yen
```

FIG. 18

```
Printing is complete.
· x sheets
· Color
· 50 Yen
```

FIG. 24

| LENDER PRINTER START | MANAGEMENT APPARATUS START | EXTERNAL USER TERMINAL START | MANAGEMENT SERVER START |
|---|---|---|---|
| STANDBY STATE | TRANSMIT ADMINISTRATOR INFORMATION — S302 | | |
| ↓ S100 | | | S104 — REGISTER ADMINISTRATOR INFORMATION |
| | | S306 — TRANSMIT USER INFORMATION | |
| | | | S108 — REGISTER USER INFORMATION |
| | | | S110 — TRANSMIT PRINTER INFORMATION |
| RETURN FROM STANDBY STATE — S314 | | DISPLAY PRINTER INFORMATION — S312 | |
| RECEIVE PASSWORD — S316 | | | |
| AUTHENTICATION PROCESS — S318 | | | |
| USABLE STATE WITH FUNCTION RESTRICTION — S320 | | | |
| | S322 — TRANSMIT USE STATE | | |
| | | | S324 — UPDATE USE STATE |
| COPYING PROCESS — S326 | | | |
| TRANSMIT USE INFORMATION — S328 | | | |
| DISPLAY USE RESULT — S330 | TRANSMIT USE INFORMATION — S332 | | |
| | | | S176 — ADD LOG INFORMATION |
| | | | S178 — CANCEL ASSOCIATION |
| END | END | END | END |

PRINTING INSTRUCTING APPARATUS, MANAGEMENT SERVER, PRINTING MANAGEMENT APPARATUS, PRINTER, NON-TRANSITORY COMPUTER READABLE MEDIUM, AND PRINTING INSTRUCTION METHOD FOR TRANSMITTING AND RECEIVING INFORMATION RELATED TO PRINTING

CROSS-REFERENCE TO RELATED APPLICATIONS

This application is based on and claims priority under 35 USC 119 from Japanese Patent Application Nos. 2018-043480 filed Mar. 9, 2018 and 2018-043481 filed Mar. 9, 2018.

BACKGROUND

Technical Field

The present invention relates to a printing instructing apparatus, a management server, a printing management apparatus, a printer, a non-transitory computer readable medium, and a printing instruction method.

SUMMARY

According to an aspect of the invention, there is provided a printing instructing apparatus including a designation-information transmission unit and a printing-information transmission unit. The designation-information transmission unit transmits, to a management server, designation information that is information different from printing information indicating content of a printing target and that includes printing designation information designating the printing information. The printing-information transmission unit transmits the printing information corresponding to the printing designation information to one of multiple printers without transmitting the printing information to the management server.

BRIEF DESCRIPTION OF THE DRAWINGS

Exemplary embodiments of the present invention will be described in detail based on the following figures, wherein:

FIG. 14 is a view illustrating an example screen displayed on the external user terminal;

FIG. 17 is a view illustrating an example screen displayed on the lender administrator terminal;

FIG. 18 is a view illustrating an example screen displayed on the external user terminal;

FIG. 24 is a sequence diagram illustrating the flow of processing performed by apparatuses according to a third exemplary embodiment.

DETAILED DESCRIPTION

Hereinafter, examples of exemplary embodiments of disclosed technologies will be described with reference to the drawings.

First Exemplary Embodiment

Figure 1:
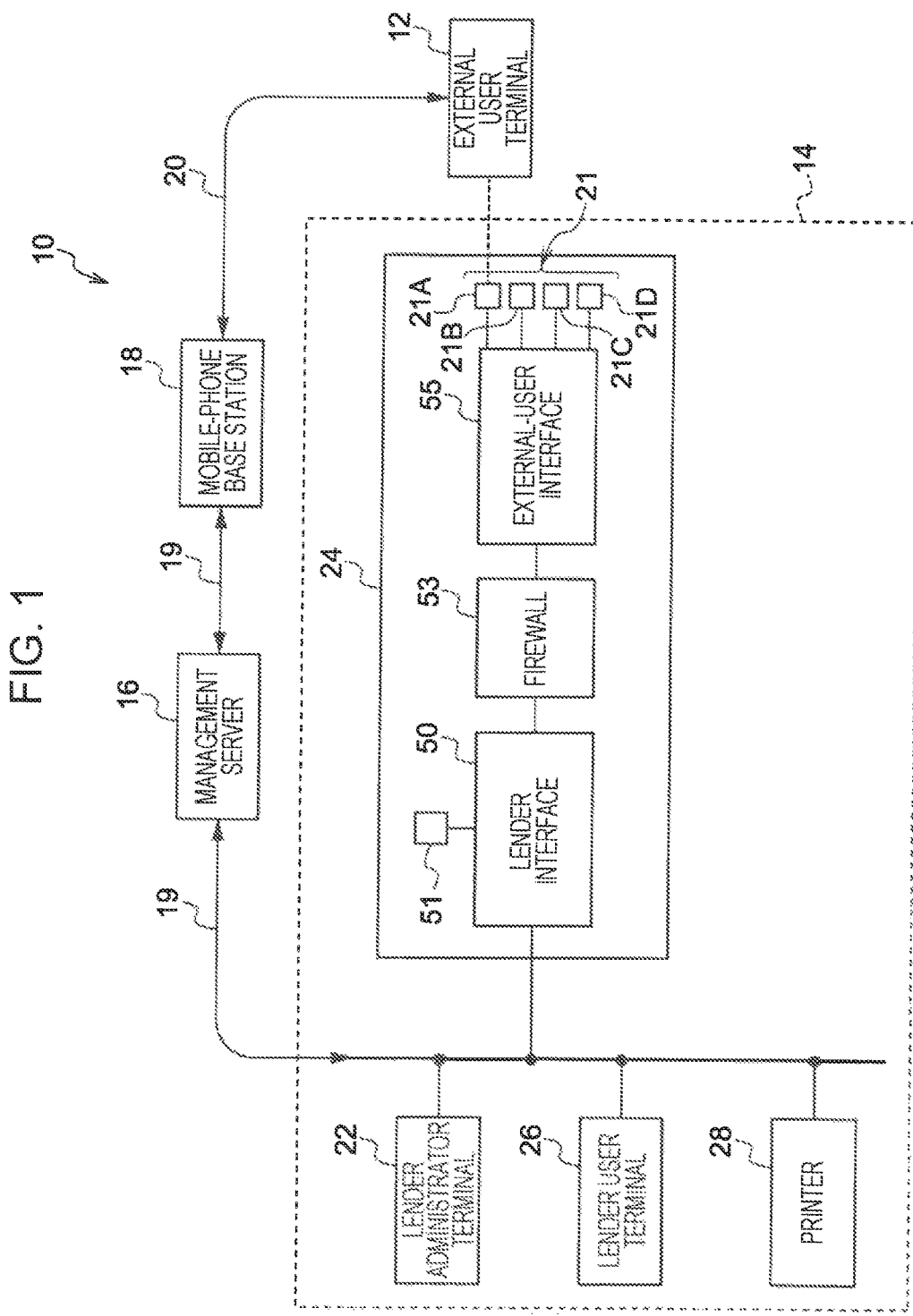
FIG. 1 is a schematic diagram illustrating an example configuration of a printing system according to a first exemplary embodiment.

FIG. 1 is a diagram illustrating the schematic configuration of a printing system 10 in a first exemplary embodiment.

As illustrated in FIG. 1, the printing system 10 includes an external user terminal 12, a lender management system 14, and a management server 16. The lender management system 14, the management server 16, and a mobile-phone base station 18 are connected via a network 19 such as the Internet. The external user terminal 12 and the mobile-phone base station 18 are connected via a mobile-phone network 20. Note that the external user terminal 12 is connectable to the lender management system 14 via an external-connection access point 21. The external user terminal 12 is an example of a printing instructing apparatus.

As illustrated in FIG. 1, the lender management system 14 includes a lender administrator terminal 22, a management apparatus 24, a lender user terminal 26, and a printer 28.

Note that the lender management system 14 may include multiple printers 28. The management apparatus 24 is an example of a printing management apparatus.

In this exemplary embodiment, when an external user uses a printer in the lender management system 14, printing is performed in such a manner that printing information is not transmitted to the management server 16, the printing information indicating the content of a target (printing target) to be printed by the external user. Hereinafter, description will be specifically provided.

External User Terminal

Figure 2:
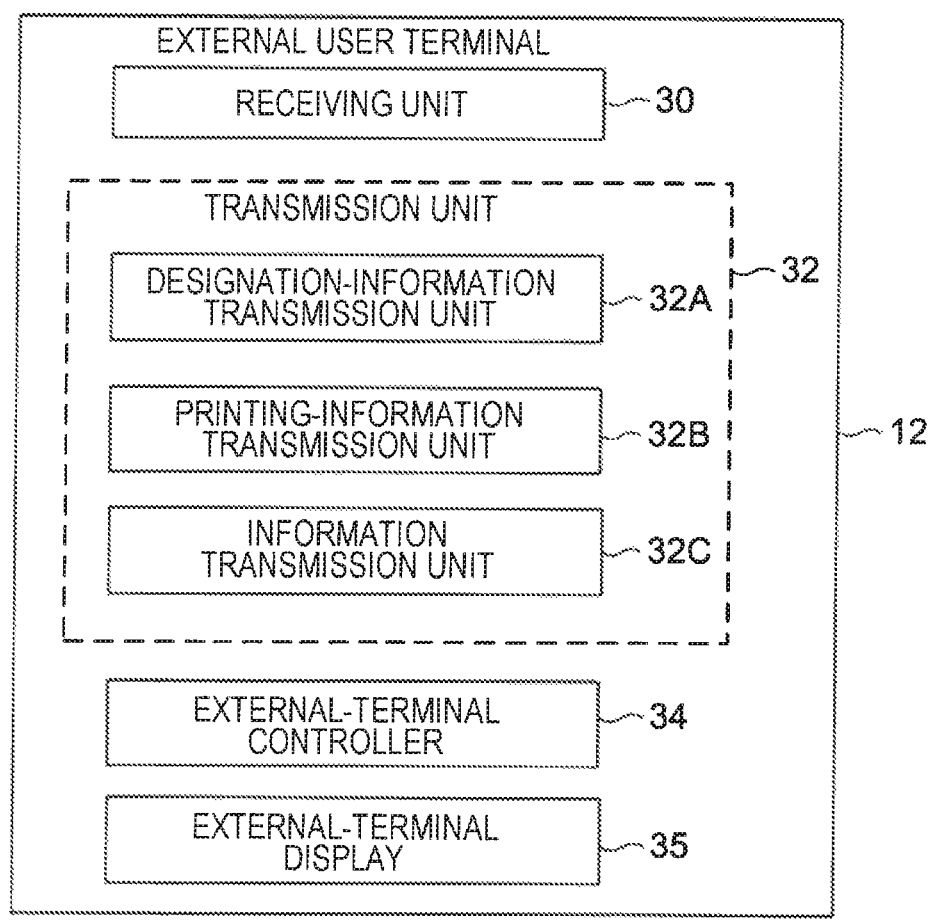
FIG. 2 is a block diagram illustrating an example configuration of an external user terminal according to the first exemplary embodiment.

As illustrated in FIG. 2, the external user terminal 12 functionally includes a receiving unit 30, a transmission unit 32, an external-terminal controller 34, and an external-terminal display 35.

The receiving unit 30 receives information transmitted from a different apparatus.

The transmission unit 32 of the external user terminal 12 includes a designation-information transmission unit 32A, a printing-information transmission unit 32B, and an information transmission unit 32C.

The designation-information transmission unit 32A transmits, to the management server 16, designation information that is information different from the printing information indicating the content of the printing target and that is used for requesting printing to be performed by a specific printer. The designation information includes printing designation information designating printing information regarding the printing target and apparatus designation information designating a printer for the printing. For example, a printer ID is transmitted as the printer designation information.

The printing-information transmission unit 32B transmits the printing information to the printer 28. The printing information is transmitted to the printer 28 without passing through the management server 16.

The information transmission unit 32C transmits information to a different apparatus.

The external-terminal controller 34 controls the external user terminal 12. The external-terminal display 35 displays a display screen or the like under the control of the external-terminal controller 34.

Management Server

Figure 3:
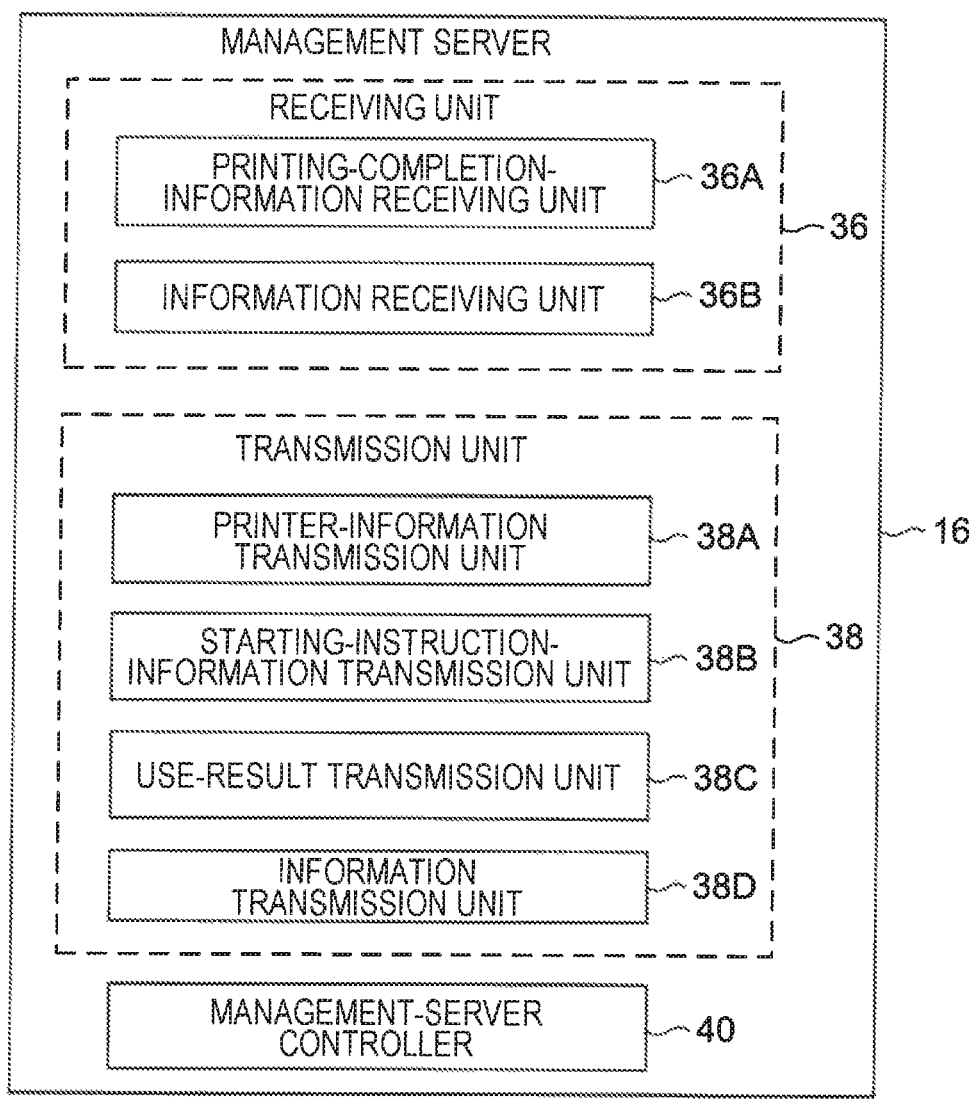
FIG. 3 is a block diagram illustrating an example configuration of a management server according to the first exemplary embodiment.

As illustrated in FIG. 3, the management server 16 functionally includes a receiving unit 36, a transmission unit 38, and a management-server controller 40.

The receiving unit 36 of the management server 16 includes a printing-completion-information receiving unit 36A and an information receiving unit 36B.

If the printer 28 prints the printing information, the printing-completion-information receiving unit 36A receives printing-completion information indicating that the printing of the printing information is complete.

The information receiving unit 36B receives information transmitted from a different apparatus.

The transmission unit 38 of the management server 16 includes a printer-information transmission unit 38A, a starting-instruction-information transmission unit 38B, a use-result transmission unit 38C, and an information transmission unit 38D.

If user information indicating information regarding a user of the printer 28 is received from the external user terminal 12, the printer-information transmission unit 38A transmits, to the external user terminal 12, printer information indicating the location of each of multiple printers and the function of each of the multiple printers. The details of the printer information will be described later.

If designation information transmitted from the external user terminal 12 is received, the starting-instruction-information transmission unit 38B transmits, to the printer 28 corresponding to the apparatus designation information included in the designation information, starting instruction information indicating a starting instruction to be given to a printer.

In response to printing-completion information received by the printing-completion-information receiving unit 36A, the use-result transmission unit 38C transmits use information indicating information regarding the details of the use of the printer 28 to the external user terminal 12 having transmitted the printing information. Details of the use information will be described later.

The information transmission unit 38D transmits information to a different apparatus.

The management-server controller 40 controls the management server 16.

Lender Management System

Lender Administrator Terminal

The lender administrator terminal 22 has a function of approving or rejecting the use of the printer 28 through the external user terminal 12. Specifically, on the basis of approval or rejection of connection to the external user terminal 12 input by an administrator, the lender administrator terminal 22 manages the use of the printer 28 through the external user terminal 12.

The memory (not illustrated) of the lender administrator terminal 22 stores the following information.
(1) A management ID indicating information for identifying the management apparatus 24
(2) Information regarding a Wi-Fi (registered trademark) connection point 21A for an external user terminal
(3) Information regarding a Wi-Fi (registered trademark) connection point 51 for a lender user terminal Note that the management ID is also used as information for identifying the lender management system 14.

Figure 4:
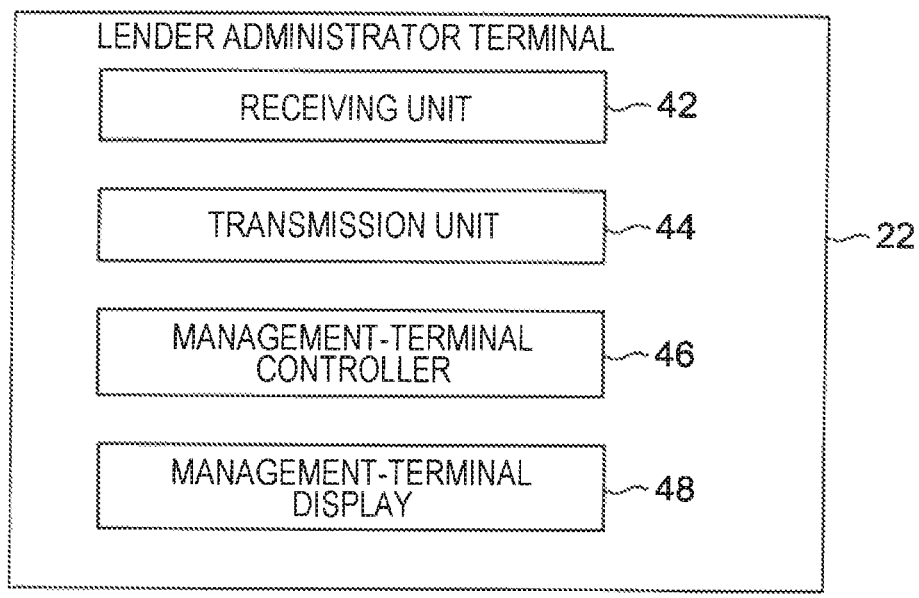
FIG. 4 is a block diagram illustrating an example configuration of a lender administrator terminal according to the first exemplary embodiment.

As illustrated in FIG. 4, the lender administrator terminal 22 functionally includes a receiving unit 42, a transmission unit 44, a management-terminal controller 46, and a management-terminal display 48.

Management Apparatus

The management apparatus 24 manages communication between the external user terminal 12 and the printer 28. As illustrated in FIG. 1, the management apparatus 24 includes a lender interface 50, the Wi-Fi (registered trademark) connection point 51 for a lender user terminal, a firewall 53, an external-user interface 55, the Wi-Fi (registered trademark) connection point 21A for an external user terminal, a Bluetooth (registered trademark) point 21B for an external user terminal, a USE port 21C for an external user terminal, and a wired LAN port 21D for an external user terminal. The lender interface 50 stores the management ID indicating information for identifying the management apparatus 24.

The firewall 53 allows information needed for a printing process to pass therethrough and does not allow unneeded information to pass therethrough. The security for the lender management system 14 and the external user terminal 12 is thus ensured.

Figure 5:
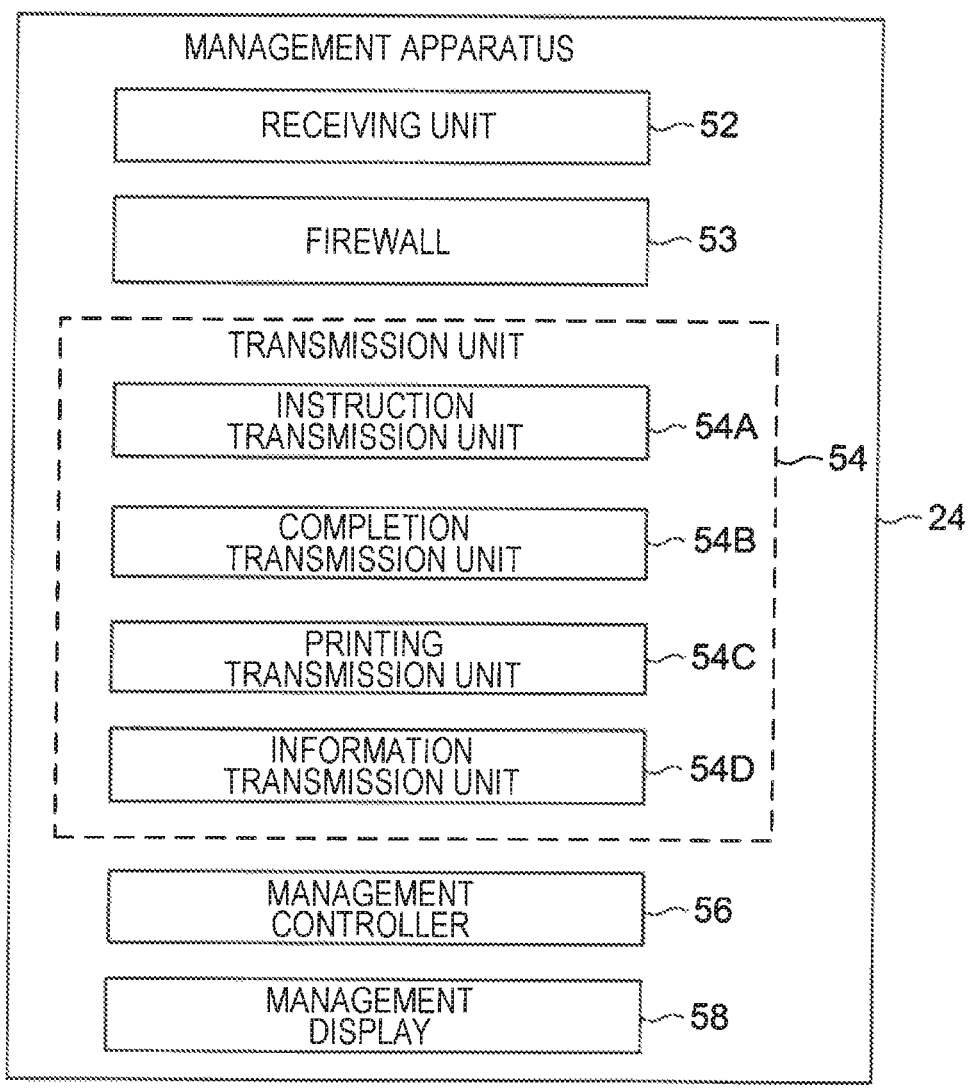
FIG. 5 is a block diagram illustrating an example configuration of a management apparatus according to the first exemplary embodiment.

As illustrated in FIG. 5, the management apparatus 24 functionally includes a receiving unit 52, the firewall 53, transmission unit 54, a management controller 56, and a management display 58.

The firewall 53 manages a communication process. For example, the firewall 53 restricts or permits communication between the lender management system 14 and the external user terminal 12.

The receiving unit 52 of the management apparatus 24 receives information transmitted from a different apparatus.

The transmission unit 54 of the management apparatus 24 includes an instruction transmission unit 54A, a completion transmission unit 54B, a printing transmission unit 54C, and an information transmission unit 54D.

If the starting instruction information transmitted from the management server 16 and indicating a starting instruction to be given to the printer 28 is received, the instruction transmission unit 54A transmits the starting instruction information to be given to the printer 28.

If printing-preparation-completion information indicating that preparation for printing by the printer 28 is complete is received, the completion transmission unit 54B transmits the printing-preparation-completion information to the external user terminal 12.

If the printing information transmitted from the external user terminal 12 is received, the printing transmission unit 54C transmits the printing information to the printer 28.

The information transmission unit 54D transmits information to a different apparatus.

The management controller 56 controls the management apparatus 24. The management display 58 displays a display screen and the like under the control of the management controller 56.

Lender User Terminal

The lender user terminal 26 is a terminal operated by a lender user. For example, the lender user operates the lender user terminal 26 and thereby performs printing by using the printer 28.

Printer

The printer 28 is an apparatus that forms an image by using a known system such as an electrophotographic system or an inkjet system. The printer 28 has image-forming-related image forming functions such as a printing function of forming an image on a recording medium such as paper, a scanning function of reading an image formed on a recording medium such as paper, and a copying function of reading an image formed on a recording medium such as paper and then forming the read image on a recording medium such as paper.

Figure 6:
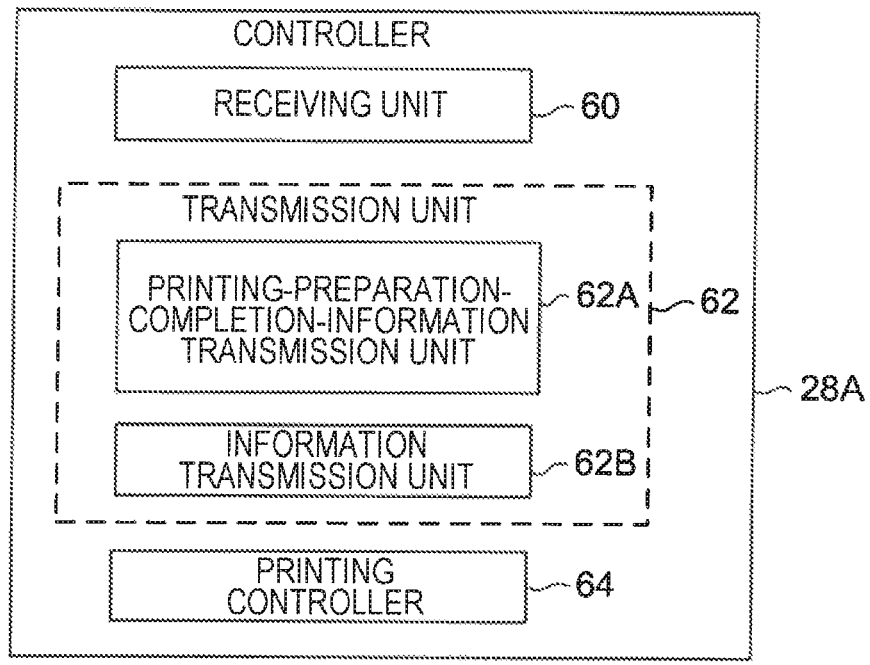
FIG. 6 is a block diagram illustrating an example configuration of a printer according to the first exemplary embodiment.

As illustrated in FIG. 6, a controller 28A that controls the printer 28 functionally includes a receiving unit 60, a transmission unit 62, and a printing controller 64.

The receiving unit 60 of the printer 28 receives information transmitted from a different apparatus.

The transmission unit 62 of the printer 28 includes a printing-preparation-completion-information transmission unit 62A and an information transmission unit 62B.

The printing-preparation-completion-information transmission unit 62A transmits, to the external user terminal 12, the printing-preparation-completion information.

The information transmission unit 62B transmits information to a different apparatus.

If the printing information transmitted from the external user terminal 12 is received, the printing controller 64 controls the printer 28 to perform printing in accordance with the printing information.

Figure 7:
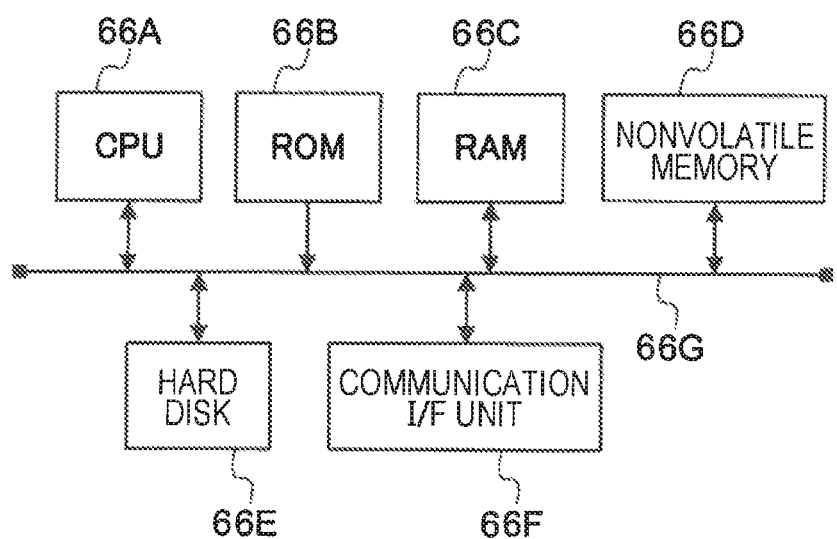
FIG. 7 is a configuration diagram illustrating the hardware configuration of each of the apparatuses.

FIG. 7 is a block diagram illustrating the hardware configuration of each of the external user terminal 12, the management server 16, the management apparatus 24, the lender administrator terminal 22, and the controller 28A of the printer 28.

The external user terminal 12, the management server 16, the management apparatus 24, the lender administrator terminal 22, and the controller 28A of the printer 28 each has a function serving as a computer and includes a central processing unit (CPU) 66A, a read only memory (ROM) 66B, a random access memory (RAM) 66C, a nonvolatile memory 66D, a hard disk 66E, and a communication interface (I/F) unit 66F. The CPU 66A, the ROM 66B, the RAM 66C, the nonvolatile memory 66D, the hard disk 66E, and the communication interface unit 66F are connected to each other via a bus 66G.

The CPU 66A that is a central processing unit runs various programs and controls the components. When operating in this manner, the CPU 66A uses the RAM 66C as a work area to run a program.

The nonvolatile memory 66D is a memory in which the content of data is held even though a corresponding one of the management server 16, the management apparatus 24, the lender administrator terminal 22, and the controller 28A of the printer 28 is powered off.

The hard disk 66E stores, for example, programs (described later) and various pieces of information.

The communication interface unit 66F communicates with a different apparatus.

The flow of a printing management process executed by the printing system 10 will be described.

Figure 8:
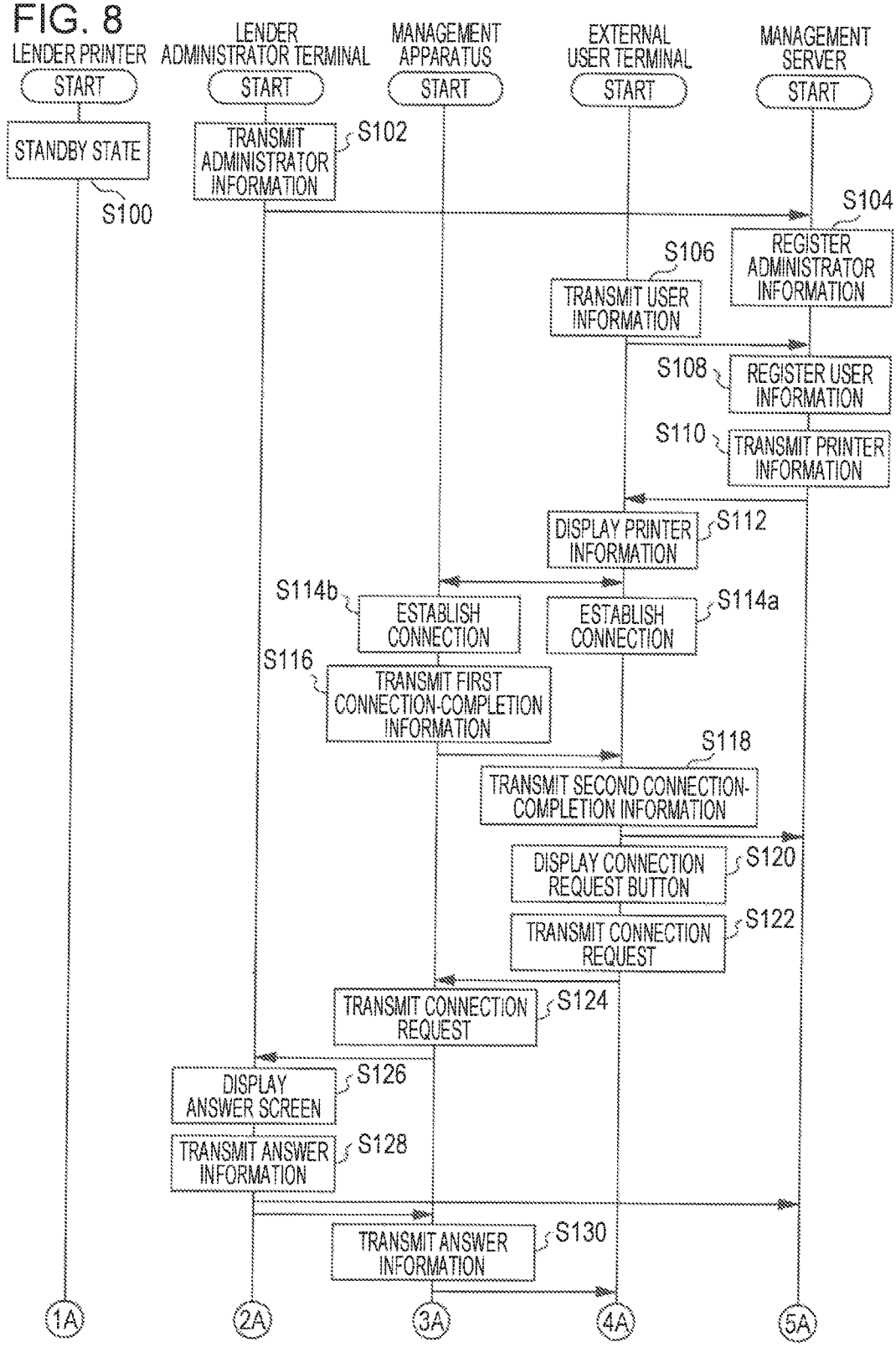
FIG. 8 is a sequence diagram illustrating the flow of processing performed by the apparatuses according to the first exemplary embodiment.

FIG. 8 is a sequence diagram illustrating the flow of the printing management process.

The external user terminal 12 performs processing in such a manner that the CPU (not illustrated) loads a program from the hard disk (not illustrated). The management server 16 performs processing in such a manner that the CPU (not illustrated) loads a program from the hard disk (not illustrated).

The lender administrator terminal 22 performs processing in such a manner that the CPU (not illustrated) loads a program from the hard disk (not illustrated). The management apparatus 24 performs processing in such a manner that the CPU (not illustrated) loads a program from the hard disk (not illustrated). The controller 28A that controls the printer 28 performs processing in such a manner that the CPU (not illustrated) loads a program from the hard disk (not illustrated).

In step S100, the printer 28 in the lender management system 14 is in a power save mode representing a standby state. In this case, the printer 28 waits for a starting instruction, and printing instructed by using the lender user terminal 26 is executable.

First, in step 3102, the administrator of the lender administrator terminal 22 inputs administrator information indicating information regarding the administrator in the lender administrator terminal 22, and then the lender administrator terminal 22 transmits the administrator information to the management server 16. Specifically, the lender administrator logs in the management server 16 by using the lender administrator terminal 22 and transmits the following information as the administrator information.

(1) The name, the IP address, attribute information (such as usable sheet sizes and usable colors, (colors usable or only black and white usable)), the current state (usable or unusable), and the like of the printer 28
(2) The name and the IP address of the lender administrator terminal 22
(3) The name, the IP address, and the lender management ID of the management apparatus 24
(4) The address or the location of the place where the printer 28 is installed
(5) A formula for the rental fee of the printer 28
(6) A method, a credit card number, and the like of use fee payment from the management server 16 to the lender After the administrator information is registered in the management server 16 in step S102 described above, the information (1) to (6) above is regularly transmitted to the management server 16. In particular, the current state of the printer 28 in (1) above and the information in (5) above are sequentially transmitted to the management server 16.

In step S104, the information receiving unit 36B of the management server 16 receives the administrator information transmitted from the lender administrator terminal 22. The management-server controller 40 of the management server 16 stores the administrator information in the memory (not illustrated).

In step S106, the external user inputs user information indicating information regarding the external user in the external user terminal 12, and then the external user terminal 12 transmits the user information to the management server 16. Specifically, the external user operates the external user terminal 12, logs in the management server 16 via the mobile-phone network 20, and transmits the following information as the user information.
(1) The name and the IP address of the external user terminal 12
(2) The user ID indicating identification information regarding the external user terminal 12
(3) The location information regarding the external user terminal 12
(4) Attribute information (such as sheet sizes, colors, and a duplex printing capability) of a printer intended to be used
(5) A method, a credit card number, and the like of use fee payment from the external user to the management server 16

In step S108, the information receiving unit 36B of the management server 16 receives the user information transmitted from the external user terminal 12. The management-server controller 40 of the management server 16 then stores the user information in the memory (not illustrated).

In step S110, the printer-information transmission unit 38A of the management server 16 transmits printer information indicating location information regarding multiple printers and information regarding functions of the multiple printers to the external user terminal 12 under the control of the management-server controller 40. Specifically, the printer-information transmission unit 38A of the management server 16 transmits, as the printer information, information regarding printers near the external user terminal 12 (such as the location of each printer, the attribute information of the printer, and the current use state of the printer) and map information including the location information regarding the printer to the external user terminal 12 on the basis of the location information regarding the external user terminal 12.

In step S112, the receiving unit 30 of the external user terminal 12 receives the printer information transmitted from the management server 16. The external-terminal controller 34 of the external user terminal 12 controls the external-terminal display 35 to display each piece of the printer information.

Figure 9:
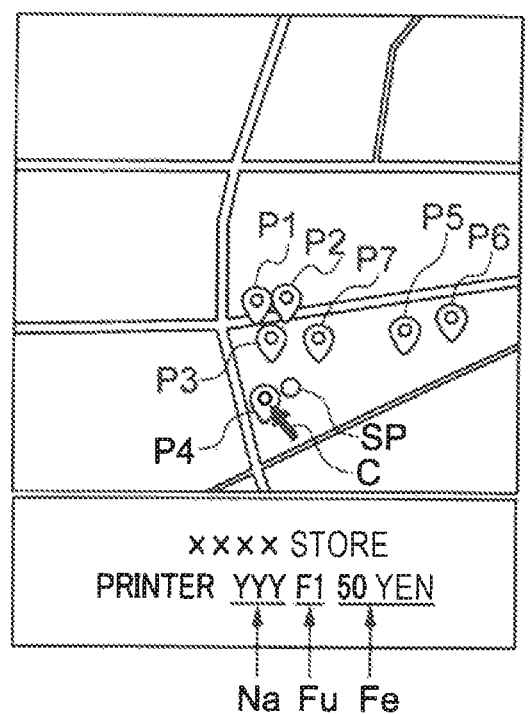
FIG. 9 is a view illustrating an example screen displayed on the external user terminal.
Figure 10:
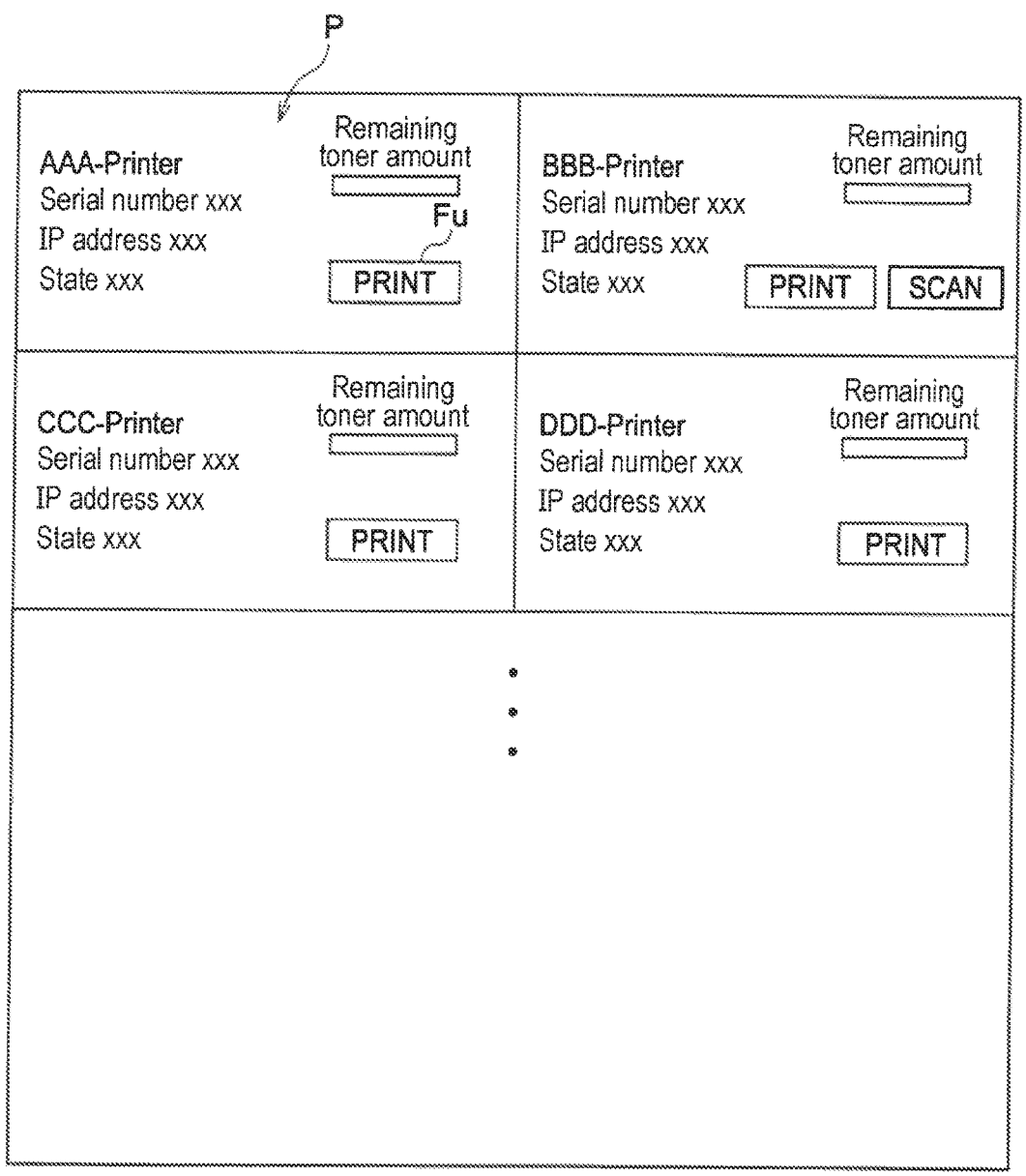
FIG. 10 is a view illustrating an example screen displayed on the external user terminal.

The external user checks each piece of printer information displayed by the external-terminal display 35. FIGS. 9 and 10 each illustrate an example of the printer information displayed by the external-terminal display 35.

FIG. 9 illustrates the map information including the location information regarding the multiple printers in the printer information. Reference signs P1 to P7 respectively denote the pieces of location information regarding the printers, and a reference sign SP denotes the location information regarding the external user terminal 12. In this case, when a cursor C is placed on one of the pieces of location information regarding the corresponding printer, the printer information on which the cursor C is placed is displayed as illustrated in FIG. 9. For example, a model name Na regarding the printer, function information Fu regarding the printer, and a fee Fe for the use of the printer are displayed.

FIG. 10 illustrates the function information regarding the multiple printers in the printer information. As illustrated in FIG. 10, PRINT indicating printability is displayed as the function information Fu regarding a printer P. If a printer has the scanner function, SCAN is displayed. State on the display screen represents the state of the printer, and, for example, information regarding whether a different user is using the printer.

Subsequently, the external user selects a printer intended to be used from the multiple printers on the basis of the location information regarding the printers and the function information. Hereinafter, a case where the printer 28 in the lender management system 14 is selected as a use target will herein be described taken as an example. The external user visits the place where the printer 28 is installed.

The external user meets the administrator in the place where the printer 28 is installed and is permitted network connection between the lender management system 14 and the external user terminal 12. For example, the external user obtains a service set identifier (SSID) and a password for Wi-Fi (registered trademark) external connection from the administrator in the visited place. When the external user terminal 12 carried by the external user approaches the Wi-Fi (registered trademark) connection point 21A for an external user terminal, steps S114a and S114b are started.

In steps S114a and S114b, the external user terminal 12 and the management apparatus 24 respectively perform the network connection. In this case, the external user inputs the SSID and the password for the Wi-Fi (registered trademark) external connection by using the display screen displayed on the external-terminal display 35 of the external user terminal 12, and the Wi-Fi (registered trademark) connection with the management apparatus 24 is established. Note that the external user terminal 12 may perform pairing with the management apparatus 24 to establish the connection by using the Bluetooth (registered trademark) point 21B, instead of the Wi-Fi (registered trademark) connection. The external user terminal 12 may also use the USB port 21C to establish the connection with the management apparatus 24.

After the network connection is established in the external user terminal 12 and the management apparatus 24, the information transmission unit 54D of the management apparatus 24 transmits first connection-completion information to the external user terminal 12 in step S116, the first connection-completion information indicating that the connection is complete. Specifically, the information transmission unit 54D of the management apparatus 24 transmits, to the external user terminal 12, information indicating the establishment of the connection with the management apparatus 24, the name of the management apparatus 24, and the IP address of the management apparatus 24, the pieces of information serving as the first connection-completion information.

In step S118, the receiving unit 30 of the external user terminal 12 receives the first connection-completion information transmitted from the management apparatus 24. The information transmission unit 54D of the external user terminal 12 transmits second connection-completion information to the management server 16 under the control of the external-terminal controller 34. Specifically, after the Wi-Fi (registered trademark) connection with the management apparatus 24 is established, and after the information regarding the completion of the connection with the management apparatus 24 is received, the information transmission unit 54D of the external user terminal 12 transmits, to the management server 16, the information regarding the external user terminal 12 (for example, the user ID), the information regarding Wi-Fi (registered trademark) external connection (for example, the SSID), and the information indicating the establishment of the Wi-Fi (registered trademark) connection between the external user terminal 12 and the management apparatus 24, the pieces of information serving as the second connection-completion information.

Note that the user ID and the lender management ID may be transmitted from the management apparatus 24 to the management server 16 or may be transmitted from the external user terminal 12 to the management server 16. In this case, the management server 16 may display a state of association between the user ID and the lender management ID on the display screen.

In step S120, the external-terminal display 35 of the external user terminal 12 displays a display screen regarding a request for connection with the printer 28.

Figure 11:
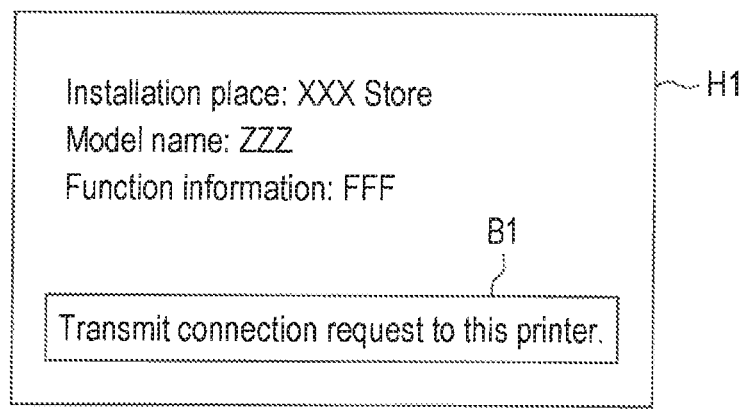
FIG. 11 is a view illustrating an example screen displayed on the external user terminal.

FIG. 11 illustrates an example display screen regarding a request for connection with a printer. As illustrated in FIG. 11, a display screen H1 includes a button B1 representing a request for connection with a specific printer.

After the external user presses the button representing the connection request in step S120 described above, the information transmission unit 54D of the external user terminal 12 transmits the connection request including the user ID to the management apparatus 24 in step S122.

In step S124, the receiving unit 52 of the management apparatus 24 receives the connection request transmitted from the external user terminal 12. The firewall 53 in the management apparatus 24 allows the connection request to pass therethrough. The information transmission unit 54D of the management apparatus 24 transmits the connection request to the lender administrator terminal 22 under the control of the management controller 56.

In step S126, the receiving unit 42 of the lender administrator terminal 22 receives the connection request transmitted from the management apparatus 24. The management-terminal controller 46 of the lender administrator terminal 22 causes the management-terminal display 48 to display an answer screen for an answer to the connection request. For example, the lender administrator terminal 22 performs popup display of the answer screen including information (1) and (2) below.
(1) The user ID
(2) Information indicating an answer to the connection request (for example, an Approve or Reject button)

Figure 12:
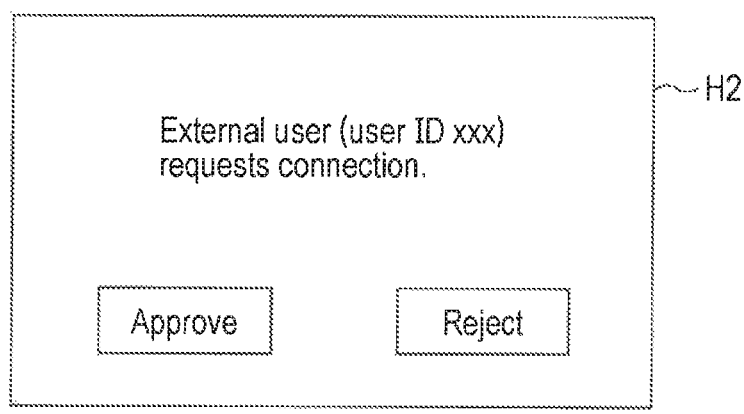
FIG. 12 is a view illustrating an example screen displayed on the lender administrator terminal.

FIG. 12 illustrates an example answer screen. As illustrated in FIG. 12, an answer screen H2 includes the user ID of the external user terminal 12 and buttons respectively used for approving and rejecting the connection request from the external user.

The management-terminal controller 46 of the lender administrator terminal 22 waits for the pressing of the Approve or Reject button by the administrator. When the administrator presses the Approve or Reject button on the answer screen, step S128 is started. Note that a configuration in which Approve is automatically implemented without displaying the popup screen may be used.

In step S128, the lender administrator terminal 22 receives the answer information input by the administrator. The answer information indicates either approval or rejection of the connection request in step S126 described above.

In step S128, the lender administrator terminal 22 transmits, to the management apparatus 24 and the management server 16, the connection-request answer information for the user ID, the management ID indicating the lender identification information, and the user ID.

In step S130, the receiving unit 52 of the management apparatus 24 receives the answer information, the management ID, and the user ID that are transmitted from the lender administrator terminal 22. The information transmission unit 54D of the management apparatus 24 transmits the answer information, the management ID, and the user ID to the external user terminal 12.

Figure 13:
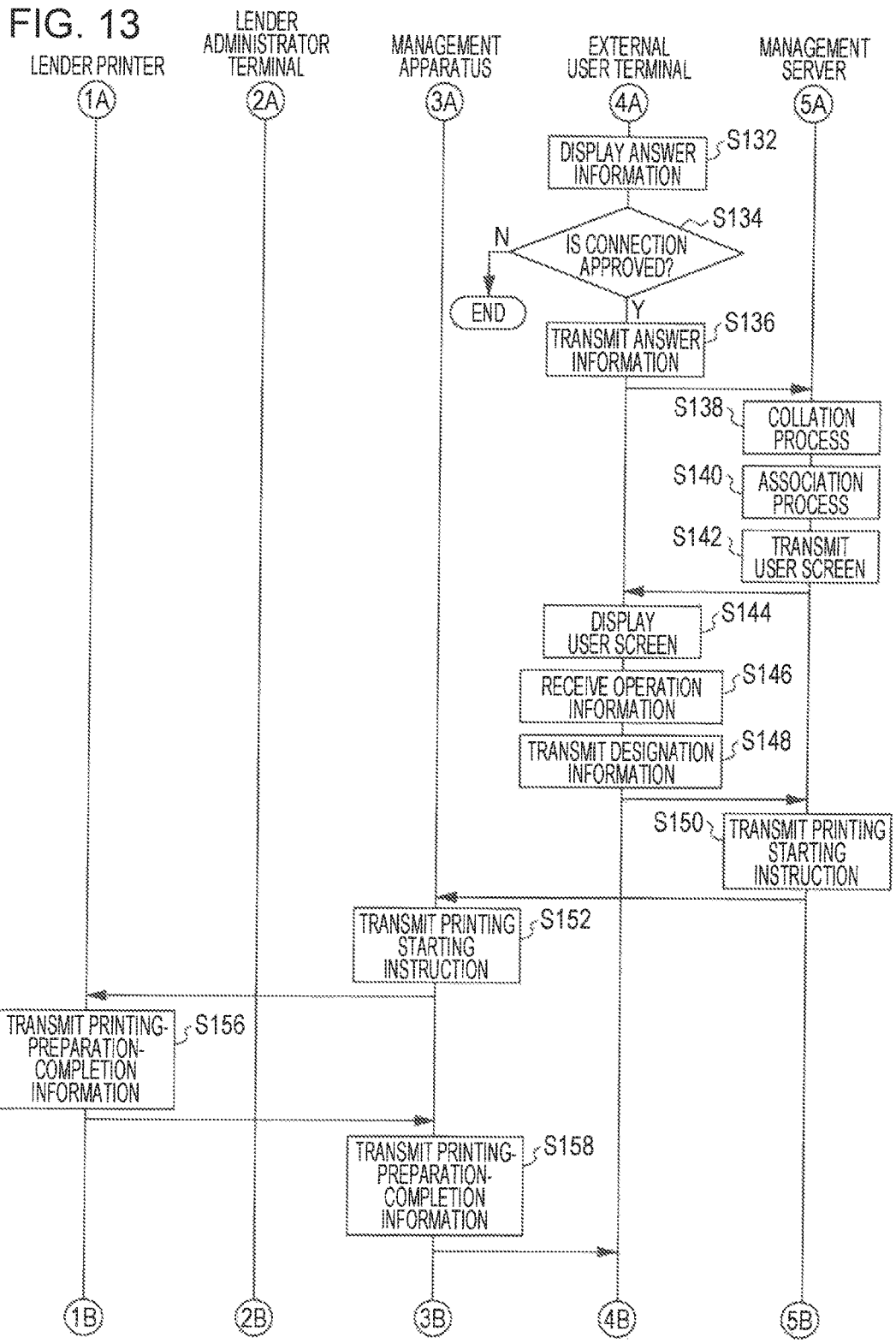
FIG. 13 is a sequence diagram illustrating the flow of the processing performed by the apparatuses according to the first exemplary embodiment.

In step S132 illustrated in FIG. 13, the receiving unit 30 of the external user terminal 12 receives the answer information, the management ID, and the user ID that are transmitted from the management apparatus 24. In step S132, the external-terminal controller 34 of the external user terminal 12 controls the external-terminal display 35 to display the answer information. The Approve or Reject answer to the connection request is displayed on the screen of the external-terminal display 35. The external user recognizes whether the use of the printer 28 is approved or rejected.

FIG. 14 illustrates an example display screen. As illustrated in FIG. 14, if the connection is approved, for example, the message "Connection is approved. Give printing instruction from portal." is displayed.

In step S134, the external-terminal controller 34 of the external user terminal 12 judges whether the answer information indicates that the connection is approved or rejected. If the answer information indicates that the connection is approved, the process proceeds to step S136. In contrast, if the answer information indicates that the connection is rejected, the process is terminated.

In step S136, the information transmission unit 54D of the external user terminal 12 transmits the answer information, the management ID, and the user ID to the management server 16 under the control of the external-terminal controller 34.

In step S138, the management controller 56 of the management server 16 collates the answer information, the management ID, and the user ID that are transmitted from the lender administrator terminal 22 in step S128 described above with the answer information, the management ID, and the user ID that are received in step S136 described above and judges whether the information corresponds to the counterpart. If the information does not correspond to the counterpart, an information transmission or receiving error and intended false information transmission are conceivable. Hence, the management controller 56 of the management server 16 outputs error information to the lender administrator terminal 22 and the external user terminal 12 and terminates the process. The description is herein continued on the assumption that the information corresponds to the counterpart.

In step S140, the management controller 56 of the management server 16 executes an association process on the basis of the answer information, the management ID, and the user ID that are transmitted from the lender administrator terminal 22 in step S128 and also on the basis of the answer information, the management ID, and the user ID that are received in step S136 described above. Specifically, the management controller 56 of the management server 16 associates the user ID and the management ID with each other.

In step S142, the information transmission unit 54D of the management server 16 transmits a user screen for the external user to use the printer 28 to the external user terminal 12 under the control of the management controller 56. The user screen includes the following information.
(1) The user information including the user ID
(2) The management ID
(3) An icon representing the printer 28 and the information regarding the printer 28

In step S144, the receiving unit 30 of the external user terminal 12 receives the user screen transmitted from the management server 16. The external-terminal display 35 of the external user terminal 12 displays the user screen under the control of the external-terminal controller 34.

Figure 15:
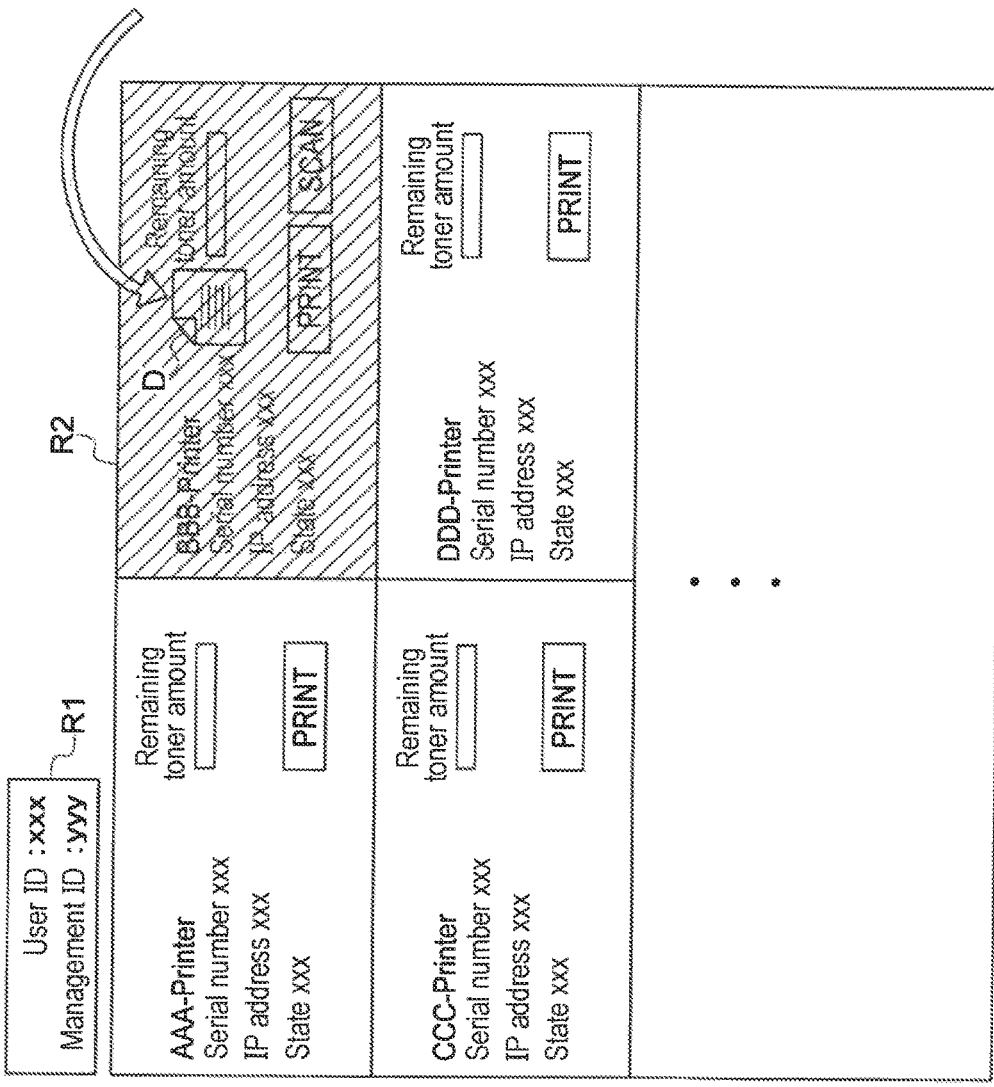
FIG. 15 is a view illustrating an example screen displayed on the external user terminal.

FIG. 15 illustrates an example user screen. As illustrated in a part denoted by R1 in FIG. 15, the user ID of the external user terminal 12 and the management ID are displayed. The external user thereby checks the user screen and thereby recognizes which printing system (lender company or office) is connected to the external user terminal 12. In addition, a change in the color of an icon R2 indicating the printer 28 on the user screen indicates that printing to be performed by the printer 28 is approved. At this time point, the external user obtains a printing permission from the lender administrator.

Subsequently, the external user operates the external user terminal 12 and inputs operation information for performing the printing in the external user terminal 12.

Specifically, as illustrated in FIG. 15, the external user operates the external user terminal 12 in such a manner as to superpose a document icon D indicating printing information regarding a printing target on the printer icon R2 on the user screen. Printing by the printing system 10 is thereby started.

In step S146, the external user terminal 12 receives the information input by the external user.

In step S148, the designation-information transmission unit 32A of the external user terminal 12 transmits designation information to the management server 16 under the control of the external-terminal controller 34, the designation information including printing designation information designating the printing information input through the operation by the external user and apparatus designation information designating the printer 28.

In step S150, the information receiving unit 36B of the management server 16 receives the designation information transmitted from the external user terminal 12. The starting-instruction-information transmission unit 38B of the management server 16 transmits starting instruction information to the printer 28 corresponding to the apparatus designation information of the designation information via the management apparatus 24 under the control of the external-terminal controller 34.

In step S152, the receiving unit 52 of the management apparatus 24 receives the starting instruction information transmitted from the management server 16. The instruction transmission unit 54A of the management apparatus 24 transmits the starting instruction information to the printer 28 under the control of the management controller 56. The management apparatus 24 waits for completion of preparation for printing by the printer 28.

In step S156, the receiving unit 60 of the printer 28 receives the starting instruction information transmitted from the management apparatus 24. If the preparation for printing by the printer 28 is complete, the printing-preparation-completion-information transmission unit 62A of the printer 23 transmits the printing-preparation-completion information to the external user terminal 12 via the management apparatus 24.

In step S158, the receiving unit 52 of the management apparatus 24 receives the printing-preparation-completion information transmitted from the printer 28. The printing-preparation-completion-information transmission unit 62A of the management apparatus 24 transmits the printing-preparation-completion information to the external user terminal 12.

Figure 16:
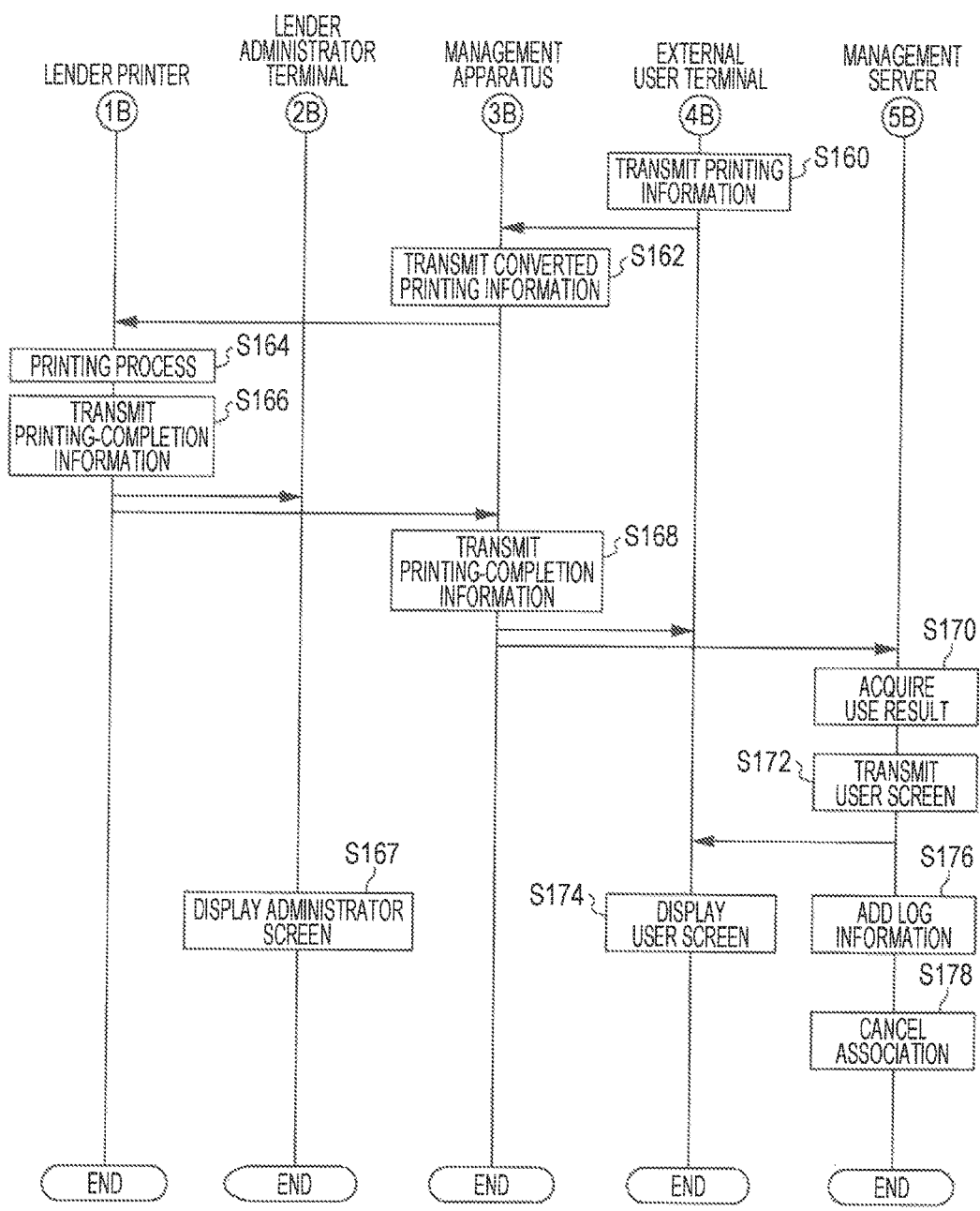
FIG. 16 is a sequence diagram illustrating the flow of the processing performed by the apparatuses according to the first exemplary embodiment.

In step S160 illustrated in FIG. 16, the receiving unit 30 of the external user terminal 12 receives the printing-preparation-completion information transmitted from the management apparatus 24. The printing-information transmission unit 32B of the external user terminal 12 transmits the printing information corresponding to the printing designation information transmitted to the management server 16 in step S148 described above to the printer 28 via the management apparatus 24 without transmitting the printing information to the management server 16. Note that the printing-information transmission unit 32B transmits the printing information to the printer 28 corresponding to the apparatus designation information transmitted to the management server 16 in step S148 described above. The content of the printing target is thereby transmitted to the printer 28 without passing through the management server 16 that is an external server. The printing request and printing result management (for example, accounting management) are performed by the management server 16.

In step S162, the receiving unit 52 of the management apparatus 24 receives the printing information transmitted from the external user terminal 12. The management controller 56 of the management apparatus 24 converts the format of the printing information to a predetermined format. For example, the management controller 56 converts the format of the printing information in accordance with the model of the printer 28. The printing transmission unit 54C of the management apparatus 24 transmits the converted printing information to the printer 28.

In step S164, the receiving unit 60 of the printer 28 receives the converted printing information transmitted from the management apparatus 24. The printing controller 64 of the printer 28 controls the printer 28 to print the printing information.

After the printing process in step S164 described above is complete, the information transmission unit 54D of the printer 28 transmits printing-completion information indicating that the printing of the printing information is complete to the lender administrator terminal 22 and the management apparatus 24 in step S166. After the elapse of a predetermined period of time after the printing is terminated, the printer 28 enters the power save mode.

In step S167, the receiving unit 42 of the lender administrator terminal 22 receives the printing-completion information transmitted from the printer 28. The management-terminal controller 46 of the lender administrator terminal 22 controls the management display 58 to display the completion of the printing by the external user. For example, the management display 58 displays the number of sheets printed by the external user, printing attributes (such as color/monochrome and a size), a use fee, and the like. For example, as illustrated in FIG. 17, the number of printed sheets, the printing attributes, the use fee, and the like are displayed together with the message "Printing by the external user is complete".

In step S168, the receiving unit 52 of the management apparatus 24 receives the printing-completion information transmitted from the printer 28. The information transmission unit 54D of the management apparatus 24 transmits the printing-completion information to the external user terminal 12 and the management server 16. The printing-completion information includes the lender management ID, the user ID, the number of printed sheets, the printing attributes (such as color/monochrome and a size), the use fee, and the like.

In step S170, the printing-completion-information receiving unit 36A of the management server 16 receives the printing-completion information transmitted from the management apparatus 24. The management-server controller 40 of the management server 16 acquires use information regarding the printer 28 included in the printing-completion information. The use information includes, for example, the lender management ID, the user ID, the number of printed sheets, the printing attributes (such as color/monochrome and a size), and the use fee. The management-server controller 40 of the management server 16 calculates a charge to the external user on the basis of the user ID, the use fee, and the like in the use information and stores the charge in the memory (not illustrated). The management-server controller 40 of the management server 16 adds the charge to a lender payment amount in the use information.

In step S172, the use-result transmission unit 38C of the management server 16 transmits a user screen to the external user terminal 12. The user screen includes information such as the number of printed sheets, and the printing attributes (such as color/monochrome and a size), and the use fee incurred from the printing. For example, as illustrated in FIG. 18, the number of printed sheets, the printing attributes, the use fee, and the like are displayed together with the message "Printing is complete".

In step S174, the receiving unit 30 of the external user terminal 12 receives the user screen transmitted from the management server 16. The external-terminal controller 34 of the external user terminal 12 controls the external-terminal display 35 to display the user screen. The user screen includes the information such as the number of printed sheets, the printing attributes (such as color/monochrome and a size), and the use fee incurred from the printing.

In step S176, the management-server controller 40 of the management server 16 adds log information indicating a history of use by the external user on the basis of the use information. The log information includes information such as the user ID, the used printer ID, the management ID, the number of printed sheets, the printing attributes (such as color/monochrome and a size), and the use fee incurred from the printing.

In step S178, the management-server controller 40 of the management server 16 cancels the association performed in step S140 described above.

In this exemplary embodiment as described above, if the external user uses the printer, the printing designation information designating the printing information indicating the content of the printing target is transmitted to the management server. The printing information corresponding to the printing designation information is transmitted to the printer without being transmitted to the management server. Even in the case where the management server manages the use of the printer by the external user, the printer is used in such a manner that the content of the target to be printed by the external user is not transmitted to the management server.

Second Exemplary Embodiment

A second exemplary embodiment will be described. Note that the same components as those in the first exemplary embodiment are denoted by the same reference numerals, and detailed description is omitted.

Figure 19:
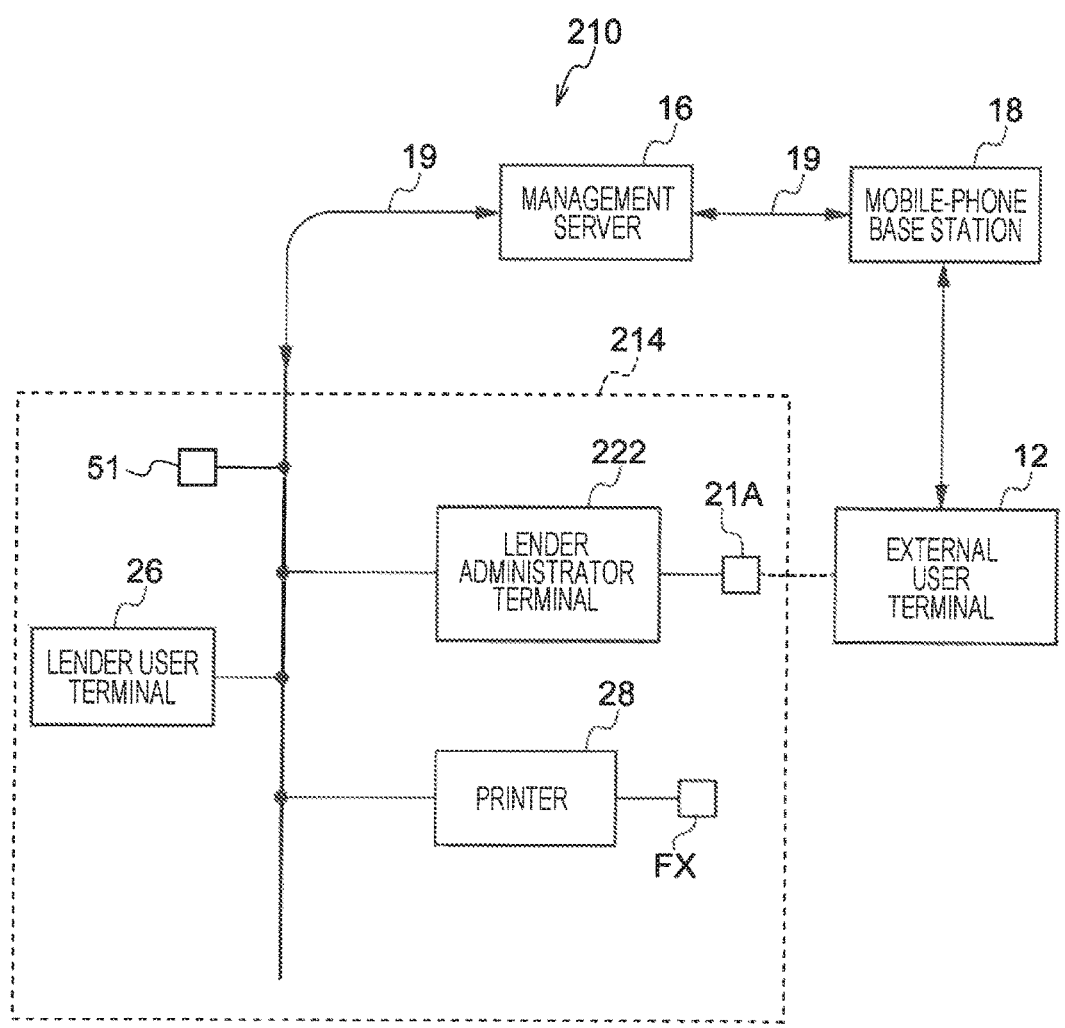
FIG. 19 is a schematic diagram illustrating an example configuration of a printing system according to a second exemplary embodiment.

FIG. 19 is a diagram illustrating the schematic configuration of a printing system 210 in the second exemplary embodiment. The printing system 210 in the second exemplary embodiment is different from the printing system 10 in the first exemplary embodiment in that a lender administrator terminal 222 has the function of the management apparatus 24 in the first exemplary embodiment.

As illustrated in FIG. 19, the printing system 210 includes the external user terminal 12, a lender management system 214, and the management server 16.

As illustrated in FIG. 19, the lender management system 214 includes the lender administrator terminal 222, the lender user terminal 26, and the printer 28.

Figure 20:
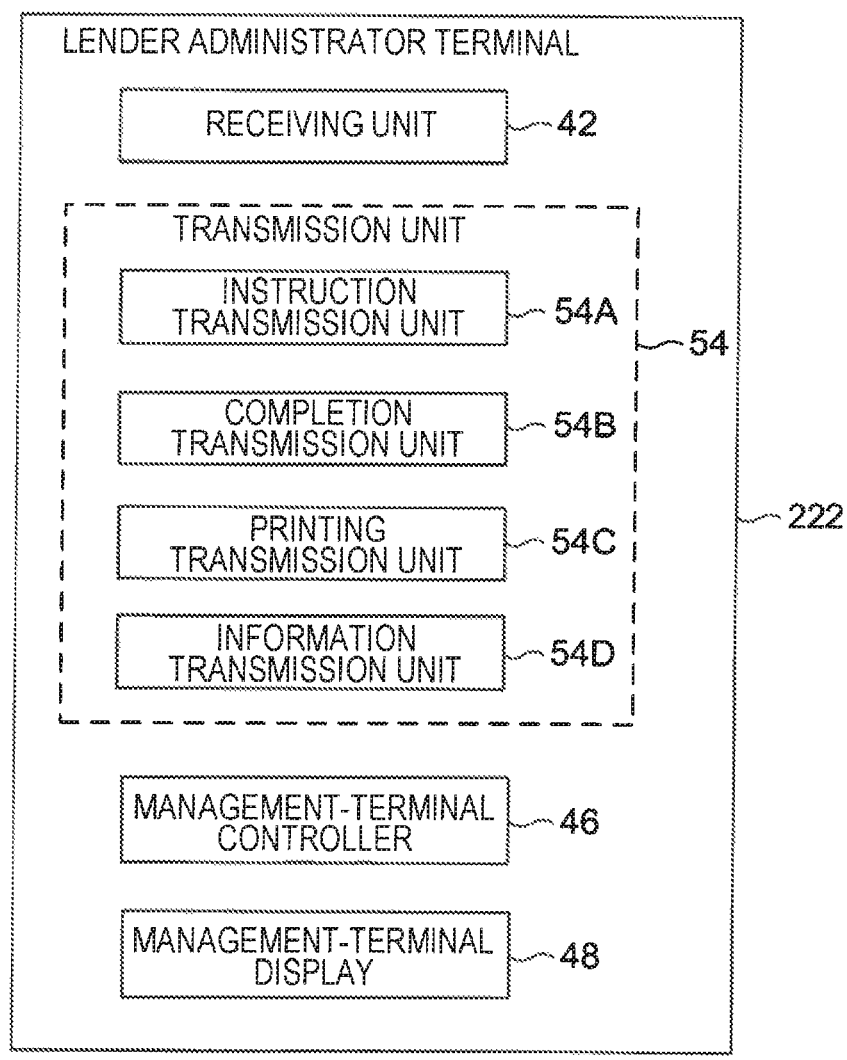
FIG. 20 is a block diagram illustrating an example configuration of a lender administrator terminal according to the second exemplary embodiment.

The lender administrator terminal 222 further has the function of the management apparatus 24 in the first exemplary embodiment. As illustrated in FIG. 20, the lender administrator terminal 222 functionally includes the receiving unit 42, the transmission unit 54, the management-terminal controller 46, and the management-terminal display 48.

The receiving unit 52 of the lender administrator terminal 222 receives information transmitted from a different apparatus.

The transmission unit 54 of the lender administrator terminal 222 includes the instruction transmission unit 54A, the completion transmission unit 54B, the printing transmission unit 54C, and the information transmission unit 54D.

The lender administrator terminal 222 has the Wi-Fi (registered trademark) connection point 21A for an external user terminal. Note that the memory (not illustrated) of the lender administrator terminal 222 stores a lender management ID. The lender administrator terminal 222 implements the function of the management apparatus 24 in the first exemplary embodiment by using application software of the lender administrator terminal 222. The lender administrator terminal 222 has the firewall function for the operating system and thus restrains communication with a Wi-Fi (registered trademark) external-connection access point.

The flow of a printing management process by the printing system 210 in the second exemplary embodiment will be described.

Figure 21:
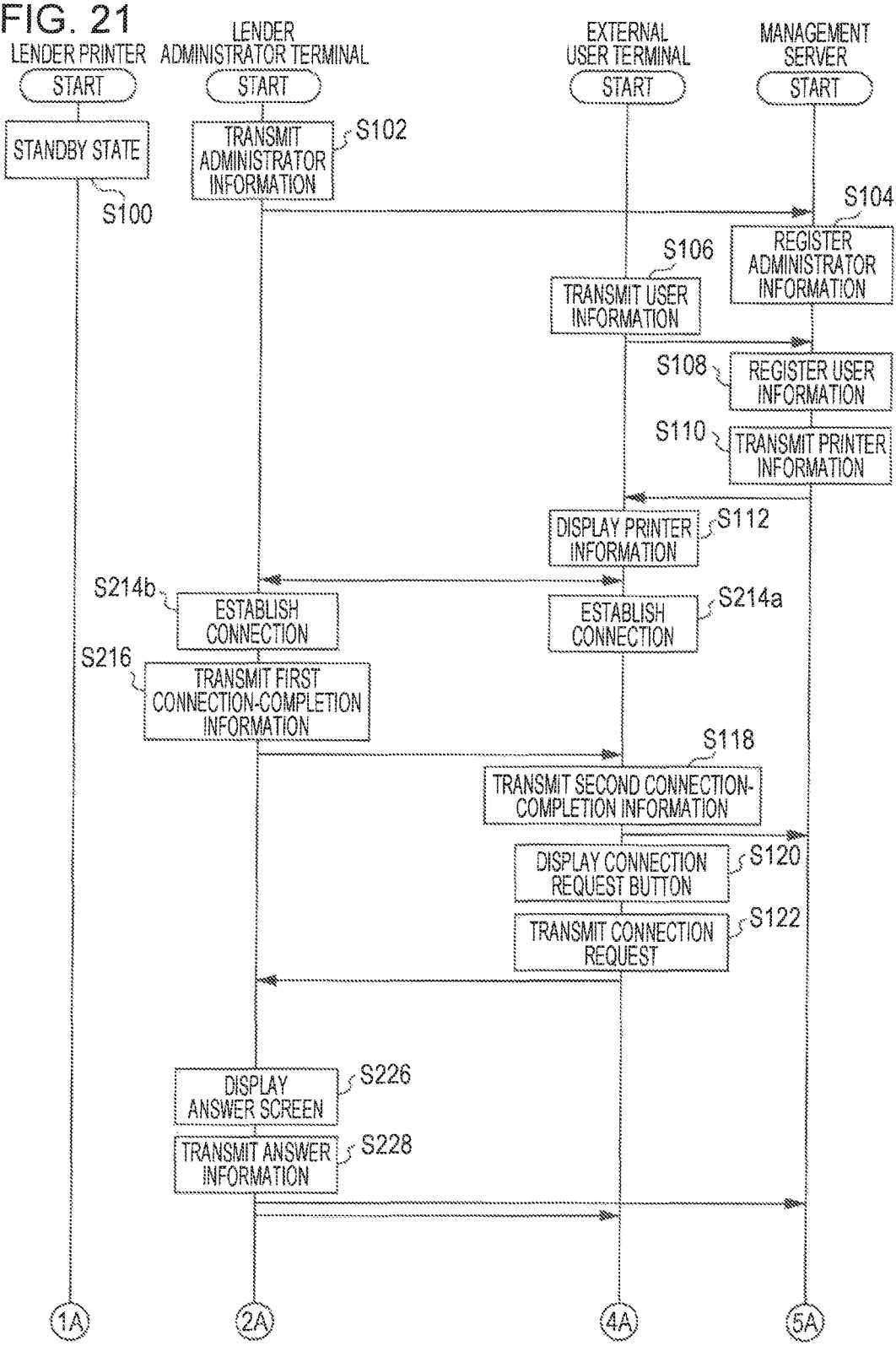
FIG. 21 is a sequence diagram illustrating the flow of processing performed by apparatuses according to the second exemplary embodiment.

FIG. 21 is a sequence diagram illustrating the flow of the printing management process according to the second exemplary embodiment. Only steps different from those in the first exemplary embodiment will herein be described.

In steps S214a and S2l4b, the external user terminal 12 and the lender administrator terminal 222 respectively perform the network connection. In this case, the external user inputs the SSID and the password for the Wi-Fi (registered trademark) external connection by using the display screen displayed on the external-terminal display 35 of the external user terminal 12, and the Wi-Fi (registered trademark) connection with the lender administrator terminal 222 is established.

After the network connection is established in the external user terminal 12 and the lender administrator terminal 222, the information transmission unit 54D of the lender administrator terminal 222 transmits the first connection-completion information to the external user terminal 12 in step S216, the first connection-completion information indicating that the connection is complete. Specifically, the information transmission unit 54D of the lender administrator terminal 222 transmits, to the external user terminal 12, the information indicating the establishment of the connection with the lender administrator terminal. 222, the name of the management apparatus 24, and the IP address of the lender administrator terminal 222, the pieces of information serving as the first connection-completion information.

In step 3226, the receiving unit 42 of the lender administrator terminal 222 receives the connection request. The management-terminal controller 46 of the lender administrator terminal 222 causes the management-terminal display 48 to display the answer screen for an answer to the connection request. When the administrator presses the Approve or Reject button on the answer screen, step S228 is started.

In step 3228, the lender administrator terminal 222 receives the answer information input by the administrator. In step 3228, the lender administrator terminal 222 transmits, to the external user terminal 12 and the management server 16, the connection-request answer information for the user ID, the lender management ID indicating the identification information, and the user ID.

Figure 22:
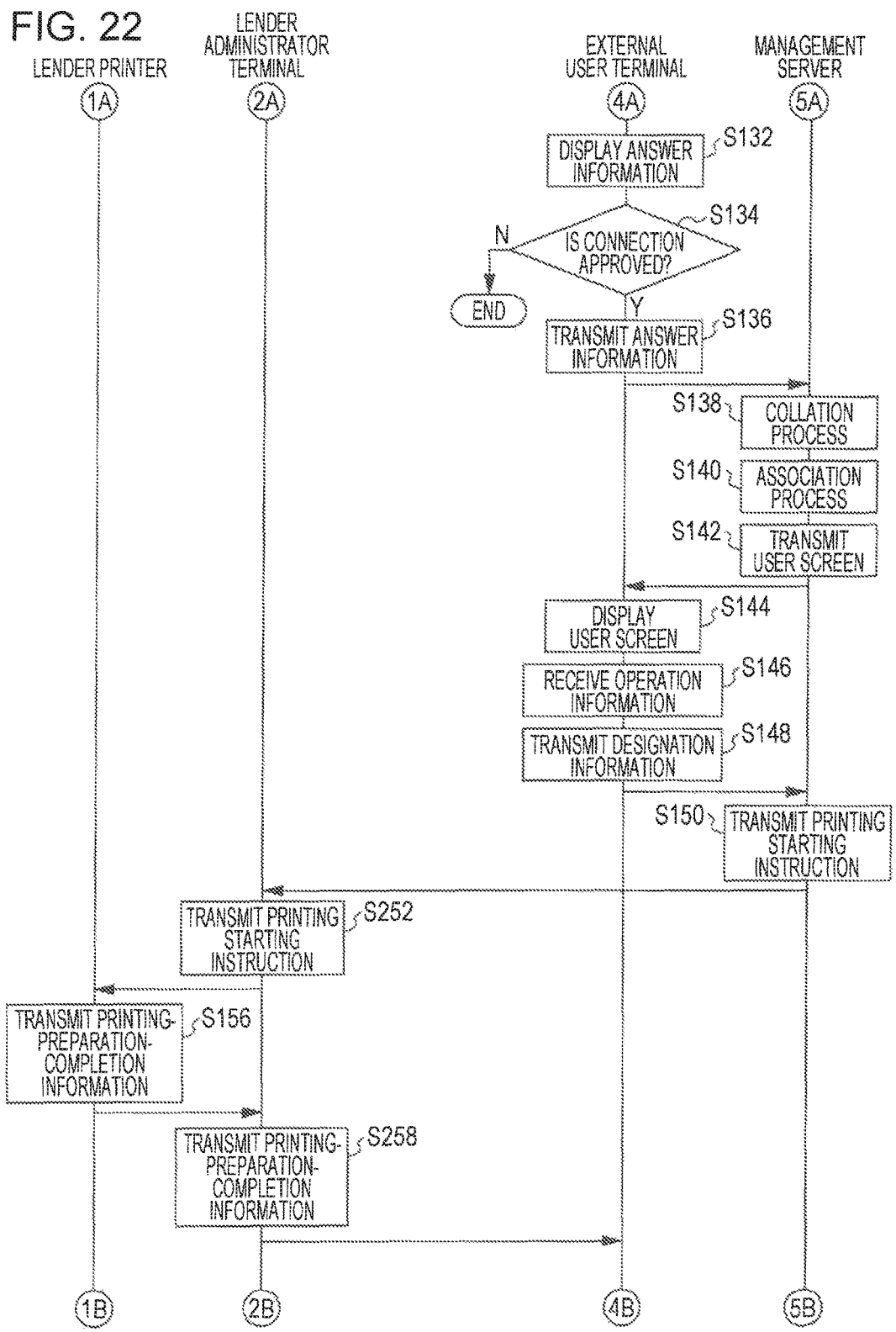
FIG. 22 is a sequence diagram illustrating the flow of the processing performed by the apparatuses according to the second exemplary embodiment.

In step S252 illustrated in FIG. 22, the receiving unit 42 of the lender administrator terminal 222 receives the starting instruction information transmitted from the management server 16. The instruction transmission unit 54A of the lender administrator terminal 222 transmits the starting instruction information to the printer 28.

In step S258, the receiving unit 42 of the lender administrator terminal 222 receives the printing-preparation-completion information transmitted from the printer 28. The printing-preparation-completion-information transmission unit 62A of the lender administrator terminal 222 transmits the printing-preparation-completion information to the external user terminal 12.

Figure 23:
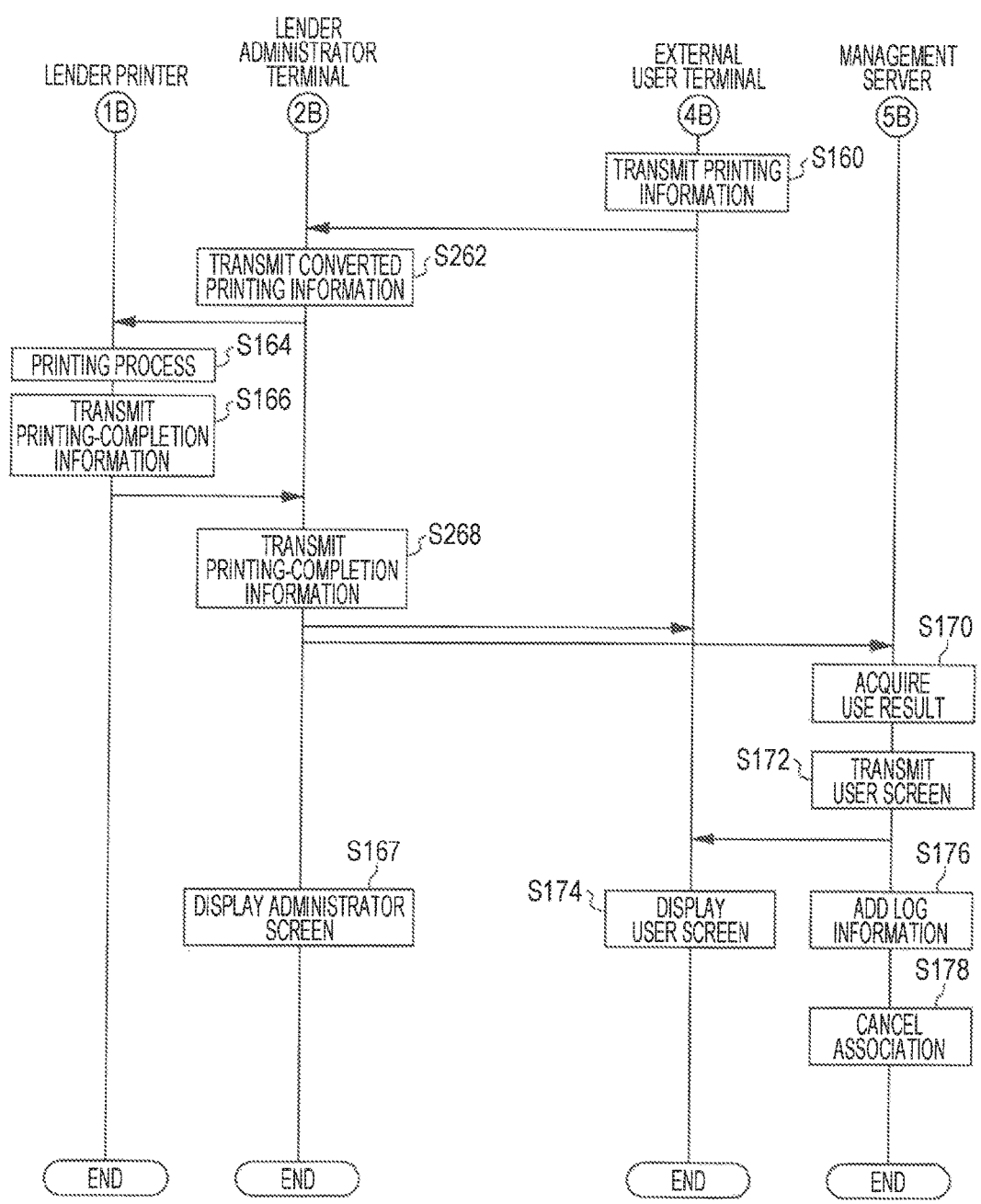
FIG. 23 is a sequence diagram illustrating the flow of the processing performed by the apparatuses according to the second exemplary embodiment.

In step S262 illustrated in FIG. 23, the receiving unit 42 of the lender administrator terminal 222 receives the printing information transmitted from the external user terminal 12. The management-terminal controller 46 of the lender administrator terminal 222 converts the format of the printing information to a predetermined format. The printing transmission unit 54C of the lender administrator terminal 222 transmits the converted printing information to the printer 28.

In step S268, the receiving unit 42 of the lender administrator terminal 222 receives the printing-completion information transmitted from the printer 28. The information transmission unit 54D of the lender administrator terminal 222 transmits the printing-completion information to the external user terminal 12 and the management server 16.

In the second exemplary embodiment as described above, the lender administrator terminal manages communication between the external user terminal and the printer. Even in the case where the management server manages the use of the printer by the external user, the printer is used in such a manner that the content of the target to be printed by the external user is not transmitted to the management server.

Third Exemplary Embodiment

A third exemplary embodiment will be described. Note that the same components as those in the first or second exemplary embodiment are denoted by the same reference numerals, and detailed description is omitted.

The third exemplary embodiment is different from the first and second exemplary embodiments in that the external user performs a copying operation by using the printer 28.

FIG. 24 is a sequence diagram illustrating the flow of a printing management process according to the third exemplary embodiment. Only steps different from those in the first and second exemplary embodiments will herein be described.

In step S302, the management apparatus 24 transmits administrator information to the management server 16. Specifically, the lender administrator logs in the management server 16 via the management apparatus 24 and transmits the administrator information.

After the external user inputs the user information in the external user terminal 12, the external user terminal 12 transmits the user information to the management server 16 in step S306. Note that the external user selects a printer intended to be used and having a copying capability as attribute information of the printer.

In step S312, the receiving unit 30 of the external user terminal 12 receives the printer information transmitted from the management server 16. The external-terminal controller 34 of the external user terminal 12 controls the external-terminal display 35 to display each piece of the printer information. The external user checks each piece of printer information displayed by the external-terminal display 35 and visits the place where the printer 28 capable of copying is installed. For example, the external user obtains a password for using the copying function of the printer 28 from the administrator. Alternatively, the external user may operate the external user terminal 12 and thereby obtain, via the management apparatus 24, the password for using the copying function of the printer 28.

After obtaining the password for using the copying function of the printer 28, the external user goes to the location where the printer 28 is installed and operates the printer 28.

In step S314, the printer 28 returns from the power save mode that is the standby state to a normal state.

The external user inputs the password in the printer 28.

In step S316, the printing controller 64 of the printer 28 receives the input password.

In step S318, the printing controller 64 of the printer 28 collates the input password with the information set in advance and thereby executes an authentication process.

After the authentication process in step S318 described above is terminated, the printing controller 64 of the printer 28 causes the display screen of the printer 28 to display a screen for using the copying function in step S320.

The screen displayed at this time is a screen for the external user and is in a state where a usable function is restricted to the copying function. The use of all of the functions of the printer 28 by the external user causes inconvenience in some cases. Accordingly, in accordance with the password input in step S318 described above, the screen is displayed with at least one of the functions of the printer 28 being restricted.

In an example, a button for the copying function and buttons for functions other than the copying function are displayed on the display screen. Even in a case where any of the buttons for the functions other than the copying function is touched, input is not received, and thereby the corresponding function of the printer 28 is restricted.

In another example, the buttons for the functions other than the copying function are not displayed, and thereby the functions may be restricted.

In step S320, the information transmission unit 62B of the printer 28 transmits a use state to the management apparatus 24, the use state indicating that the external user is using the printer 28.

In step S322, the receiving unit 52 of the management apparatus 24 receives the use state transmitted from the printer 28. The information transmission unit 54D of the management apparatus 24 transmits the use state to the management server 16.

In step S324, the information receiving unit 36B of the management server 16 receives the use state transmitted from the management apparatus 24. The management-server controller 40 of the management server 16 updates the use state of the printer 28. For example, when intending to perform a copying operation, a different external user recognizes that the printer 28 is being used. Accordingly, the different external user considers the use of a printer different from the printer 28.

In step S326, the printer 28 performs copying in response to a user operation by the external user.

Upon completion of the copying in step S326 described above, the information transmission unit 62B of the printer 28 transmits use information regarding the copying to the management apparatus 24 in step S328.

In step S330, the printing controller 64 of the printer 28 causes the display screen of the printer 28 to display a use result.

In step S332, the receiving unit 52 of the management apparatus 24 receives the use result transmitted from the printer 28. The information transmission unit 54D of the management apparatus 24 transmits the use result to the management server 16.

In the third exemplary embodiment as described above, when the external user uses the printer, a function of the printer is restricted in accordance with the password for the external user to use the printer. The external user thus uses the printer.

Although the case of the copying process has been described as an example in the above-described third exemplary embodiment, a faxing process may be executed likewise. In the case of the faxing process, a fax port FX of the printer 28 is used.

The present invention has heretofore been described by using the exemplary embodiments, but the scope of the present invention is not limited to the scope of the exemplary embodiments. Various modifications and improvements may be made to the exemplary embodiments without departing from the spirit of the present invention, and a modified or improved mode may also be included in the technical scope of the present invention.

The case where the management apparatus 24 and the lender administrator terminal 22 are separately provided has been described taken as an example in the first exemplary embodiment, and the case where the lender administrator terminal 222 has the function of the management apparatus has been described taken as an example in the second exemplary embodiment. However, the present invention is not limited to these examples. For example, the management apparatus may implement at least one or all of the functions of the lender administrator terminal. Alternatively, the lender administrator terminal may implement at least one of all of the functions of the management apparatus.

Although the case where the user screen is generated by the management server and transmitted from the management server to the external user terminal has been described taken as an example in each exemplary embodiment, the present invention is not limited to this example. For example, information for generating the user screen may be transmitted from the management server to the external user terminal, and the external user terminal may generate the user screen on the basis of the information and display the user screen.

The cases where the printing function and the copying function are respectively used have been described taken as examples in the exemplary embodiments. However, as a different function, the external user may scan paper document by using the printer and may transmit image data as a result of the scanning to the external user terminal.

Although the case where the programs are in advance installed in the hard disk 66E has heretofore been described in each exemplary embodiment, the present invention is not limited to this. For example, the programs may be provided in such a manner as to be stored in a storage medium such as a compact disk read only memory (CD-ROM) or through a network.

Further, the case where the programs are run and thereby the processes are implemented by using a computer and software configuration thereof has heretofore been described in each exemplary embodiment; however, the present invention is not limited to this. For example, the processes may be implemented by the hardware configuration or combination of the hardware configuration and the software configuration.

The configuration of the apparatuses described in each exemplary embodiment is an example. Without departing from the spirit of the present invention, an unneeded component may be removed, and a new component may be added.

The flow of the processing performed by the programs described in each exemplary embodiment is an example. Without departing from the spirit of the present invention, an unneeded step may be removed, a new step may be added, and the order of steps may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing instructing apparatus comprising a processor and a memory associated with the processor, the processor being configured to:
    transmit, to a management server, designation information that is information different from printing information indicating content of a printing target and that includes printing designation information designating the printing information;
    transmit the printing information corresponding to the printing designation information to one of a plurality of printers without transmitting the printing information to the management server; and
    receive, from the management server, information regarding a detail of use of the one of the plurality of printers in response to the management server receiving printing-completion information.

2. The printing instructing apparatus according to claim 1, wherein if printing-preparation-completion information indicating completion of preparation for printing by the one printer is received, the processor transmits, to the one printer, the printing information corresponding to the transmitted printing designation information.

3. The printing instructing apparatus according to claim 2, wherein the designation information further includes apparatus designation information designating a printer, and
    wherein if the printing-preparation-completion information is received, the processor transmits the printing information corresponding to the printing designation information to the printer corresponding to the apparatus designation information.

4. The printing instructing apparatus according to claim 1, further comprising:
a display that displays printer information if the printer information is received, the printer information indicating at least one of a location of each of the plurality of printers and a function of each of the plurality of printers.

5. The printing instructing apparatus according to claim 2, further comprising:
a display that displays printer information if the printer information is received, the printer information indicating at least one of a location of each of the plurality of printers and a function of each of the plurality of printers.

6. The printing instructing apparatus according to claim 3, further comprising:
a display that displays printer information if the printer information is received, the printer information indicating at least one of a location of each of the plurality of printers and a function of each of the plurality of printers.

7. A management server comprising a processor and a memory associated with the processor, the processor being configured to:
transmit starting instruction information to one of a plurality of printers if designation information is received, the starting instruction information indicating a starting instruction to be given to the one printer, the designation information being information different from printing information indicating content of a printing target and including printing designation information designating the printing information;
receive printing-completion information if printing of the printing information is performed in accordance with the transmitted starting instruction information, the printing-completion information indicating completion of the printing of the printing information; and
transmit, to a printing instructing apparatus having transmitted the printing information, information regarding a detail of use of the one printer in response to the received printing-completion information.

8. The management server according to claim 7,
wherein the information regarding the detail of the use of the one printer includes information regarding a fee charged in accordance with the use of the one printer.

9. The management server according to claim 8, wherein the processor is configured to transmit printer information to the printing instructing apparatus if information regarding a user is received from the printing instructing apparatus, the printer information indicating at least one of a location of each of the plurality of printers and a function of each of the plurality of printers.

10. The management server according to claim 7, wherein the processor is further configured to transmit printer information to the printing instructing apparatus if information regarding a user is received from the printing instructing apparatus, the printer information indicating at least one of a location of each of the plurality of printers and a function of each of the plurality of printers.

11. A printing management apparatus comprising a processor and a memory associated with the processor, the processor being configured to:
transmit starting instruction information to a printer if the starting instruction information is received, the starting instruction information being transmitted from a management server and indicating a starting instruction to be given to the printer;
transmit printing-preparation-completion information to a printing instructing apparatus if the printing-preparation-completion information is received, the printing-preparation-completion information indicating completion of preparation for printing by the printer; and
transmit printing information to the printer if the printing information is received, the printing information being transmitted from the printing instructing apparatus and indicating content of a printing target.

12. A printer comprising a processor and a memory associated with the processor, the processor being configured to:
transmit printing-preparation-completion information to a printing management apparatus if starting instruction information is received and if preparation for printing by the printer is complete, the starting instruction information being transmitted from a management server and indicating an instruction to start the printer, the printing-preparation-completion information indicating that the preparation for the printing is complete; and
control the printer to perform printing in accordance with printing information indicating content of a printing target, the printer being controlled by the processor if the printing information transmitted from a printing instructing apparatus is received.

13. A non-transitory computer readable medium storing a program causing a computer to execute a process, the computer being included in a printing instructing apparatus including a transmission component, the process comprising:
designation-information transmitting in which designation information that is information different from printing information indicating content of a printing target and that includes printing designation information designating the printing information is transmitted from the transmission component to a management server;
printing-information transmitting in which the printing information corresponding to the printing designation information transmitted in the designation-information transmitting is transmitted to a printer without being transmitted from the transmission component to the management server; and
detail-of-use receiving in which information regarding a detail of use of the printer is received from the management server in response to the management server receiving printing-completion information.

* * * * *